United States Patent [19]

Takagi et al.

[11] Patent Number: 4,734,113

[45] Date of Patent: Mar. 29, 1988

[54] ATTACHMENT DEVICE FOR AIR CLEANER CASE IN ENGINES

[75] Inventors: Akinobu Takagi, Kanagawa; Yohji Kurotobi, Saitama, both of Japan

[73] Assignee: Honda Giken Kogyo Kabushiki Kaisha, Tokyo, Japan

[21] Appl. No.: 862,672

[22] Filed: May 13, 1986

[30] Foreign Application Priority Data

May 14, 1985 [JP] Japan .............................. 60-70031[U]

[51] Int. Cl.⁴ ............................................ B01D 46/10
[52] U.S. Cl. ....................................... 55/504; 55/497;
  55/502; 55/DIG. 28; 123/195 A; 123/198 E
[58] Field of Search .................. 55/510, DIG. 28, 497,
  55/502, 504, 498, 510; 123/195 A, 195 C, 198
  E; 248/224.4, 224.3

[56] References Cited

U.S. PATENT DOCUMENTS 2,720,198 10/1955 Scheiterlein ..................... 123/195 A
4,440,555 4/1984 Chichester ....................... 123/195 C

FOREIGN PATENT DOCUMENTS 593052 10/1947 United Kingdom ........... 123/195 A
926698 5/1963 United Kingdom ................... 55/510

Primary Examiner—Bernard Nozick
Attorney, Agent, or Firm—Lyon & Lyon

[57] ABSTRACT

An air cleaner case is installed by an attachment device on the back of an intake manifold having a plurality of branch tubes extending forwardly toward the intake ports, respectively, of an engine cylinder head. The attachment device includes upper and lower attachment arms on the air cleaner case extending substantially horizontally and upper and lower seats on the intake manifold. The upper and lower attachment arms are substantially vertically detachably coupled to the upper and lower seats, respectively. The lower attachment arms are coupled to the lower seats by vertical pins mounted on the lower seats and the upper attachment arms are coupled to the upper seats by vertical bolts. The air cleaner case can easily be attached and detached vertically even in the limited space surrounding the air cleaner case behind the intake manifold. The bolts on the upper attachment arms and seats can easily be tightened and loosened vertically to facilitate attachment and detachment of the air cleaner case for easy maintenance or servicing thereof.

9 Claims, 2 Drawing Figures

— 4,734,113 —

ATTACHMENT DEVICE FOR AIR CLEANER CASE IN ENGINES

BACKGROUND OF THE INVENTION

The present invention relates to an attachment device for installing an air cleaner case in position on an engine assembly.

Japanese Utility Model application No. 58(1983)-175446 discloses an air cleaner case disposed behind an intake manifold having branch tubes extending forwardly toward the intake ports of an engine cylinder head. When the air cleaner case is located as disclosed, however, the space around the air cleaner case in the engine compartment of an automobile is reduced. In case the axis of the engine is directed transversely of the automobile, not only the space surrounding the air cleaner case is reduced, but also it is difficult to attach and detach screws or bolts for fixing the air cleaner case since the air cleaner case is positioned in a rear portion of the engine compartment. Therefore, the air cleaner cannot be maintained or serviced easily.

SUMMARY OF THE INVENTION

It is an object of the present invention to provide an attachment device which allows an air cleaner case to be easily attached and detached to facilitate its maintenance or servicing.

According to one specific embodiment of the present invention, there is provided an attachment device for attaching an air cleaner case to the back of an intake manifold having a plurality of branch tubes extending forwardly toward the intake ports, respectively, of an engine cylinder head, and the attachment device includes upper and lower attachment arms on the air cleaner case that extend substantially horizontally and upper and lower seats on the intake manifold to which the attachment arms are connected. The upper and lower attachment arms are substantially vertically detachably coupled to the upper and lower seats, respectively. The lower attachment arms are coupled to the lower seats by vertical pins mounted on the lower seats and the upper attachment arms are coupled to the upper seats by vertical bolts. Since the air cleaner case is adapted to be vertically attached to or detached from the intake manifold, the air cleaner case can easily be attached and detached even in the limited space surrounding the air cleaner case behind the intake manifold. The bolts on the upper attachment arms and seats can easily be tightened and loosened vertically to facilitate attachment and detachment of the air cleaner case for easy maintenance or servicing thereof.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
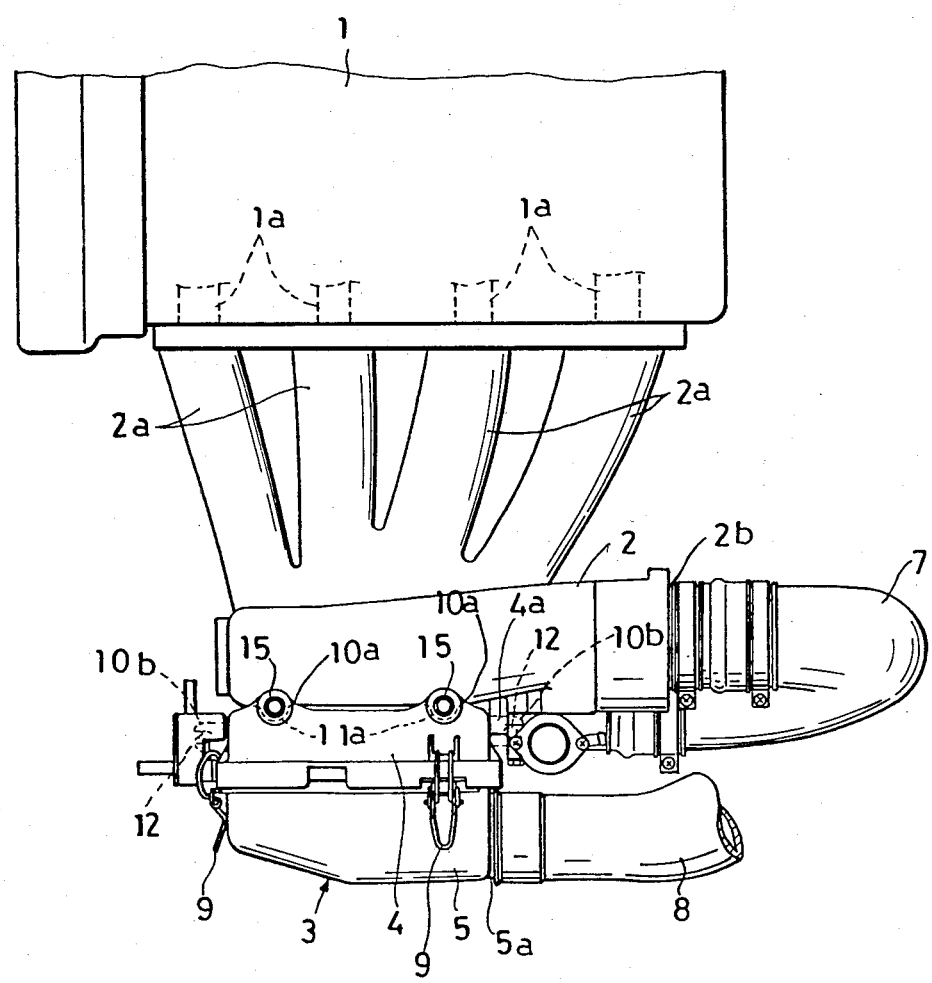
FIG. 1 is a plan view of an attachment device for an air cleaner case according to the present invention.

FIG. 1 shows an engine assembly including a cylinder head 1 having four intake ports 1a and an intake manifold 2 having four branch tubes 2a connected to the intake ports 1a, respectively. The engine is arranged transversely in the vehicle and an air cleaner case 3 is disposed on the rear surface of the intake manifold 2.

Figure 2:
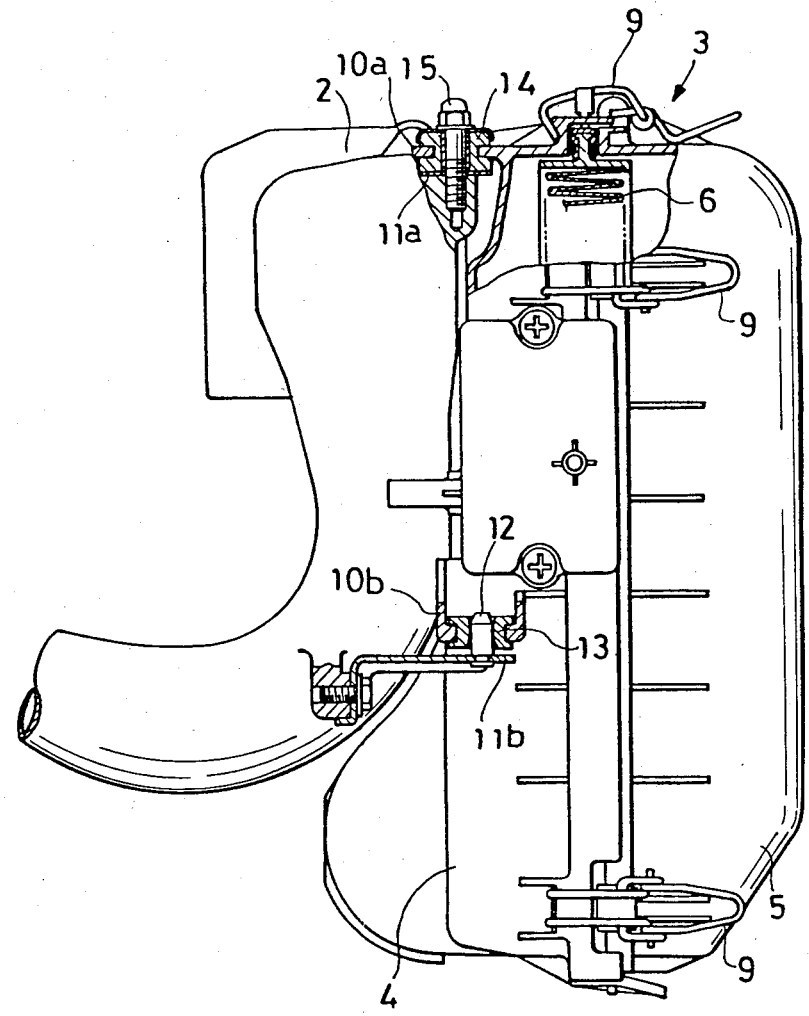
FIG. 2 is an enlarged side elevational view, partly cut away, of the attachment device shown in FIG. 1.

The air cleaner case 3 comprises a case body 4 in the form of a flat box which is open in its rear side and a cover 5 attached to the case body 4 in covering relation to the open rear side thereof. As shown in FIG. 2, an air cleaner element 6 housed in the case body 4 has its peripheral marginal edge held against the peripheral edge of the case body 4 by the cover 5. The case body 4 has an outlet 4a defined in a lower portion of a side wall thereof, and the cover 5 has an inlet 5a defined in an upper portion of a side wall thereof. The outlet 4a is connected to an air inlet port 2b defined in a side wall of the intake manifold 2 through a tube 7 coupled between the case body 4 and the intake manifold 2. The inlet 5a is vented to atmosphere through a tube 8 connected to the cover 5.

The cover 5 is detachably secured to the case body 4 by a plurality of fasteners 9 such as buckles mounted on the peripheral surface of the air cleaner case 3 at spaced intervals.

The case body 4 has upper and lower attachment arms 10a, 10b projecting substantially horizontally. The intake manifold 2 has upper and lower seats 11a, 11b to which the upper and lower attachment arms 10a, 10b are vertically detachably coupled, respectively. More specifically, two horizontally spaced upper attachment arms 10a, 10a project as stays forwardly from the front end of an upper wall of the case body 4 toward the intake manifold 2, and two horizontally spaced lower attachment arms 10b, 10b project as bifurcated stays forwardly from vertically central portions of the side walls of the case body 4. Two horizontally spaced upper seats 11a, 11a project rearwardly from an upper wall of the intake manifold 2, and two horizontally spaced lower seats 11b, 11b in the form of rearwardly extending brackets are attached, by bolts, to the two outermost branch tubes 2a of the intake manifold 2. Upwardly extending pins 12 with their upper ends tapered are mounted vertically on the lower seats 11b, 11b, respectively. Each of the lower attachment arms 10b are provided with a tubular cushioning grommet 13 of rubber that fits over a pin 12. The upper seats 11a have internally threaded holes in which there are downwardly threaded vertical bolts 15 extending through tubular cushioning members or grommets 14 of rubber that are fitted in the upper attachment arms or stays 10a.

As an alternative, the lower attachment arms or stays 10b and the seats 11b may be secured to each other by downwardly extending bolts rather than the illustrated pins 12.

The case body 4 can be vertically detachably coupled to the intake manifold 2 by first fitting the lower attachment arms 10b downwardly over the pins 12 and then fastening the upper attachment arms 10a to the upper seats 11a by the bolts 15. Since the air cleaner case 3 only requires vertical movement for installation and removal, without being required to be moved horizontally to a substantial extent, the space horizontally surrounding the air cleaner case 3 may be small and yet the air cleaner case 3 can easily be attached and detached in such small space. Also, the bolts 15 can easily be tightened and loosened because they can be accessed from above. In the illustrated embodiment, the lower attachment arms 10b are connected to the seats 11b by the pins 12. The lower attachment arms 10b on the lower portion of the cleaner case 2 which the worker normally finds difficult to reach can therefore easily be coupled to and separated from the seats 11b without turning any bolts. This allows the air cleaner case 2 to be attached and detached quite easily since the total number of bolts to be tightened or loosened is reduced.

Although a certain preferred embodiment has been shown and described, it should be understood that many changes and modifications may be made therein without departing from the scope of the appended claims.

What is claimed:

1. In combination with an air cleaner case containing means within its interior for cleaning air supplied thereto, an air inlet for delivering air to be cleaned to said case interior and an outlet for conducting clean air therefrom, an attachment device for attaching said air cleaner case to the back of an intake manifold having a plurality of branch tubes extending forwardly toward the intake ports, respectively, of an engine cylinder head for supplying air cleaned within said air cleaner case to said intake manifold, said attachment device comprising:

upper and lower attachment arms on said air cleaner case and extending substantially horizontally; and upper and lower seats on said intake manifold, said upper and lower attachment arms being substantially vertically detachably coupled to said upper and lower seats, respectively.

2. An attachement device according to claim 1, further including a pin mounted on each said lower seat, each said lower attachment arm being fitted downwardly over said pin, and a bolt inserted downwardly through each said upper attachment arm and threaded into a said upper seat.

3. An attachment device according to claim 2, further including a tubular cushioning grommet mounted on said upper and lower attachment arms and fitted over each said pin and each said bolt.

4. In combination with an air cleaner, an attachment device for attaching said air cleaner case in a vertical attitude on a vertical portion of an intake manifold of an engine for supplying air cleaned within said air cleaner to said intake manifold, comprising, upper and lower attachment means on said air cleaner, upper and lower seat means on said intake manifold for engaging said upper and lower attachment means, respectively, and connecting means requiring only vertical movement for connecting said attachment means to said seat means.

5. The attachment device of claim 4 wherein said connecting means for connecting said lower attachment means to said lower seat means comprises a vertical pin.

6. The attachment device of claim 4 wherein said connecting means for connecting said upper attachment means to said upper seat means comprises a vertically extending bolt.

7. The attachment device of claim 4 wherein said connecting means include cushioning means.

8. In an attachment device for attaching a vertically extending air cleaner case containing means within its interior for cleaning air supplied thereto, an air inlet for delivering air to be cleaned to said case interior and an outlet for conducting clean air therefrom on the side of a vertical portion of an engine intake manifold for supplying air cleaned within said air cleaner to said intake manifold, the improvement comprising, a pair of lower seats on the intake manifold each having a vertically extending pin, a pair of lower attachment arms on the air cleaner each having a vertically extending hole for receiving said pin, a pair of upper seats on the intake manifold each having a vertical threaded hole, a pair of upper attachment arms on the air cleaner each having a vertical hole for aligning with a threaded hole on an upper seat, and a pair of bolts for extending through the upper attachment arm holes into a threaded engagement with the upper seat holes.

9. The improvement in an attachment device of claim 8 wherein a tubular rubber cushioning grommet is provided on each attachment arm and comprises the hole therein.

* * * * *